US010259129B2

(12) United States Patent
Armand et al.

(10) Patent No.: US 10,259,129 B2
(45) Date of Patent: Apr. 16, 2019

(54) ADJUSTABLE STIFFNESS MORPHABLE MANIPULATOR

(71) Applicant: The Johns Hopkins University, Baltimore, MD (US)

(72) Inventors: Mehran Armand, Maple Lawn, MD (US); Matthew S. Moses, Lafayette, CO (US); Michael D. Kutzer, Baltimore, MD (US); Jason E. Tiffany, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 494 days.

(21) Appl. No.: 14/270,548

(22) Filed: May 6, 2014

(65) Prior Publication Data

US 2015/0321343 A1 Nov. 12, 2015

(51) Int. Cl.
*B25J 1/02* (2006.01)
*B25J 19/06* (2006.01)
*B25J 9/00* (2006.01)
*B25J 9/10* (2006.01)
B25J 15/02 (2006.01)

(52) U.S. Cl.
CPC ........... *B25J 19/068* (2013.01); *B25J 9/0015* (2013.01); *B25J 9/1075* (2013.01); *B25J 9/104* (2013.01); *B25J 15/0233* (2013.01); *Y10T 74/20323* (2015.01)

(58) Field of Classification Search
CPC ....... B25J 9/104; B25J 15/0233; B25J 15/023
See application file for complete search history.

(56) References Cited

U.S. PATENT DOCUMENTS

| 3,291,437 | A | * | 12/1966 | Bowden ................ E04G 13/021 220/4.11 |
| 4,608,817 | A | | 9/1986 | Brandyberry et al. |
| 4,698,817 | A | | 10/1987 | Burley |
| 5,456,674 | A | | 10/1995 | Bos et al. |
| 5,976,120 | A | | 11/1999 | Chow et al. |
| 6,258,195 | B1 | | 7/2001 | Holman et al. |
| 7,090,637 | B2 | * | 8/2006 | Danitz ................. A61B 1/0055 600/141 |
| 8,069,747 | B2 | * | 12/2011 | Buckingham ............ B25J 9/06 74/490.04 |
| 8,353,316 | B2 | | 1/2013 | Do |
| 8,679,002 | B2 | * | 3/2014 | Sutoh .................. A61J 15/0015 600/114 |
| 2002/0102894 | A1 | * | 8/2002 | Hansen ................... B29C 53/78 442/240 |

(Continued)

*Primary Examiner* — Victor L Macarthur
(74) *Attorney, Agent, or Firm* — Noah J. Hayward

(57) ABSTRACT

Compliant manipulators are provided, in which the manipulators include a plurality of slideably interlocked filaments each having a proximate end and a distal end. The interlocked filaments can be formed from a flexible material. The compliant manipulators can also include at least one filament-actuating device operatively connected to the respective distal ends of the plurality of slideably interlocked filaments. The at least one filament-actuating device can be manipulated directly or remotely to push and/or pull the respective filaments to impart a desired movement to the manipulator. The stiffness or flexibility of the manipulators can also be controlled to provide varying degrees of stiffness during use.

14 Claims, 7 Drawing Sheets

(56) References Cited

U.S. PATENT DOCUMENTS

| | | | |
|---|---|---|---|
| 2004/0138700 A1* | 7/2004 | Cooper | A61B 1/008 606/205 |
| 2006/0091030 A1* | 5/2006 | Tawanapoor | A47G 19/24 206/320 |
| 2007/0173693 A1* | 7/2007 | Refael | A61B 1/0055 600/144 |
| 2008/0097152 A1* | 4/2008 | Stefanchik | A61B 1/00071 600/114 |
| 2008/0234545 A1* | 9/2008 | Breedveld | A61B 1/0055 600/104 |
| 2009/0234278 A1 | 9/2009 | Eck | |
| 2010/0101765 A1 | 4/2010 | Do et al. | |
| 2010/0286480 A1* | 11/2010 | Peine | A61B 17/062 600/131 |
| 2011/0004157 A1* | 1/2011 | Dewaele | A61B 1/00071 604/95.01 |
| 2011/0152613 A1* | 6/2011 | Zubiate | A61B 1/0053 600/109 |
| 2011/0306836 A1* | 12/2011 | Ohline | A61B 1/0053 600/146 |
| 2014/0236120 A1* | 8/2014 | Tsai | A61M 25/0147 604/506 |
| 2015/0352728 A1* | 12/2015 | Wang | B25J 18/06 74/490.04 |

* cited by examiner

ADJUSTABLE STIFFNESS MORPHABLE MANIPULATOR

TECHNICAL FIELD

The presently-disclosed invention relates generally to compliant manipulators. The compliant manipulators may provide uniform stiffness throughout the manipulator or varying degrees of stiffness at discrete sections along the length of the manipulator. According to certain embodiments, the stiffness of the manipulator can be adjusted, for example while in use, as desired.

BACKGROUND

Manipulators are generally understood to be devices used to manipulate materials without direct contact by a human. Original applications were primarily related to dealing with radioactive or bio-hazardous materials. Current morphable manipulators are used primarily for inspection purposes, and not as tool manipulators, since they are not adequately stiff for applying large loads or forces. For instance, most contemporary manipulators are made with a flexible backbone that is deformed by tendons, in which the tendons are under pure tension.

The present invention includes morphable manipulators including a plurality of slideably interlocking push/pull filaments (e.g., tendons), in which the filaments may function as load-bearing elements to, at least in part, provide improved strength and allow higher forces to be developed at the distal end of the manipulator.

BRIEF SUMMARY

Certain embodiments according to the present invention provide compliant manipulators suitable for a wide variety of uses (e.g., inspection, surveillance, robotic surgery, minimally invasive surgical procedures, engineering applications, cleaning applications, etc.). In accordance with certain embodiments, the compliant manipulators include a plurality of slideably interlocked filaments each having a proximate end and a distal end. The interlocked filaments may be formed from a flexible material (e.g., super-elastic nitinol, stainless steel, flexible polymeric materials, etc.). The compliant manipulators may also include at least one filament-actuating device (e.g., gimbal plate actuators, individual linear actuators, etc.) operatively connected to the respective proximate ends of the plurality of slideably interlocked filaments. The at least one filament-actuating device can be manipulated directly or remotely to push and/or pull the respective filaments to impart movement to the manipulator.

In accordance with certain embodiments, the stiffness or flexibility of the manipulators may also be controlled to provide varying degrees of stiffness during use. For instance, the stiffness or flexibility of the manipulators may be variably controlled by incorporating, for example, a magneto-rheological fluid, a phase transition material, or electro-rheological technology into the manipulators. In this regard, the stiffness of one or more discrete sections of the manipulator may be individually adjusted by utilizing one or more of the foregoing technologies by, for example, increasing or decreasing the inter-fiber friction between adjacent fibers to select a desired stiffness at one or more of the discrete sections of the manipulators.

BRIEF DESCRIPTION OF THE DRAWING(S)

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

DETAILED DESCRIPTION

Figure 1:
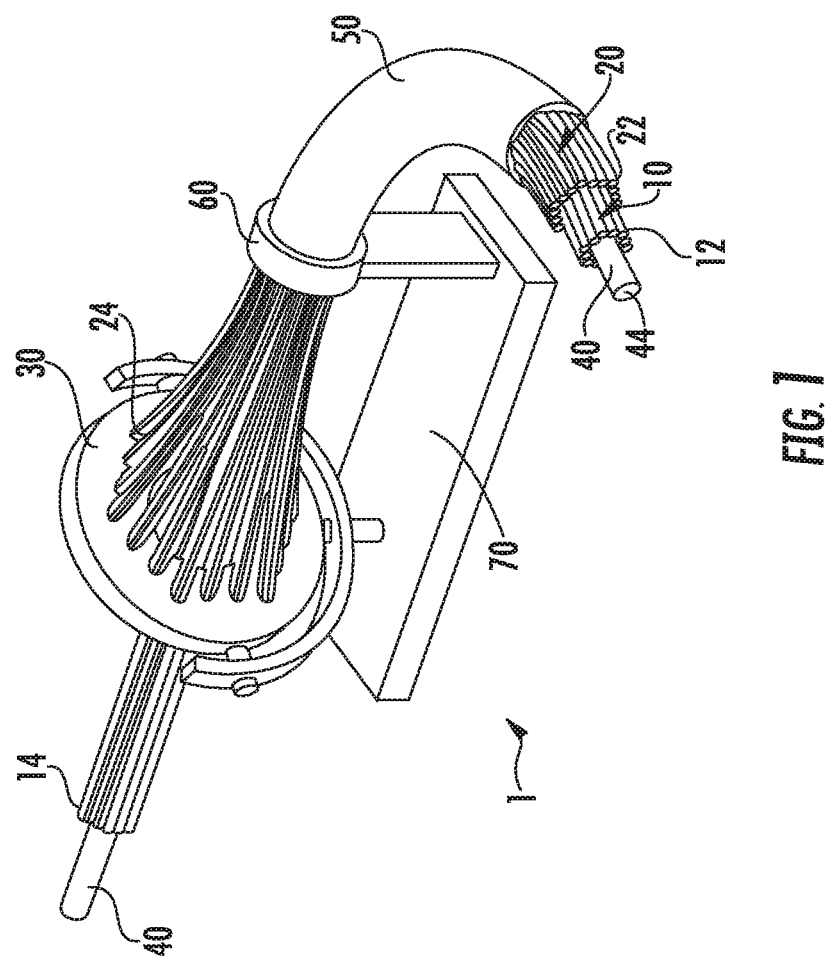
FIG. 1 illustrates a compliant manipulator according to certain embodiments of the present invention.

The present invention now will be described more fully hereinafter with reference to the accompanying drawings, in which some, but not all embodiments of the inventions are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

As used herein, the terms "stiffness" and "stiff" may comprise the measure of the rigidity of an object (e.g., filaments) in that these terms may represent the extent to which an object resists deformation (e.g., difficult to bend) in response to applied forces. Stated somewhat differently, the stiffness of an object may comprise a measure of the resistance offered by a body to deformation.

The terms "flexibility" and "flexible", as used herein, may comprise the pliability (e.g., ease or susceptibility of modification or adaption) of an object in response to applied forces. In this regard, the terms "flexibility" and "flexible" may comprise the complementary concept to the terms "stiffness" and "stiff". For example, the more "flexible" an object is, the less "stiff" the object is.

The term "compliance" and "compliant", as used herein, may comprise the inverse of stiffness. Compliance of an object may typically be measured in units of meters per newton.

In one aspect, the present invention provides compliant manipulators suitable for a wide variety of end-uses. Morphable manipulators, according to certain embodiments of the present invention, may include many desirable features for dexterous manipulation, such as robotic surgery, inspection, and surveillance to name just a few. In general, manipulators according to certain embodiments of the present invention may be constructed of multiple filaments (e.g., fibers) of flexible material (e.g., super-elastic nitinol, stainless steel, polymeric materials, etc.).

In accordance with certain embodiments of the present invention, the filaments may comprise structural configurations to enable interlocking of a plurality of the filaments to form a unitary group of slideably interlocked fibers in which individual filaments are allowed to slide in relation to one another along the axis of the manipulator while being interlocked to each other. The filaments being configured for interlocking with adjacent filaments to form a unitary group of slideably interlocked fibers can have a variety of structural configurations. For example, the individual filaments may comprise interlocking wedge-shaped or tongue-and-groove cross sections that can be mutually locked together, yet allow the individual filaments (or groups of filaments) to slide in relation to one another along the axis of the manipulator (e.g., along the longitudinal length of the individual filaments). The slideably interlocked fibers, according to certain embodiments of the present invention, may form or define a conduit. The interlocking construction of the filaments, for instance, can form or provide a lumen that may be unobstructed for the passage of other tools, including a smaller version of the same manipulator. In this regard, certain embodiments of the present invention may comprise both an increased stiffness and the ability to pass multiple tools along its length.

The filaments, according to certain embodiments of the present invention, may comprise push-pull filaments, in which the individual filaments (or groups of filaments) may be pushed and/or pulled independently of the other individual filaments (or other groups of filaments). In this regard, certain embodiments of the present invention may include interlocked push-pull filaments. In contrast to other cable-driven designs, the filaments according to certain embodiments of the present invention may be used in both tension and compression, and the filaments themselves may comprise the primary load-bearing components of the structure. Compared with cable-driven designs, for example, a greater bulk of the manipulators according to certain embodiment of the present invention may be composed of load-bearing elements; providing higher strength and allowing higher forces to be developed at the distal end of the manipulator. In this regard, certain embodiments of the present invention provide a significantly stiffer manipulator than comparable cable-driven morphable manipulators. This increased stiffness provides an increased ability to apply normal forces at the distal end (e.g., distal tip of manipulator) for a variety of applications (e.g., drilling, etc.).

In accordance with certain embodiments, the compliant manipulators may comprise a plurality of slideably interlocked filaments each having a proximate end and a distal end. The interlocked filaments may be formed from a flexible material (e.g., super-elastic nitinol, stainless steel, flexible polymeric materials, etc.). In accordance with certain embodiments of the present invention, for example, the interlocked filaments may be formed from super-elastic nickel-titanium, nickel (electroformed), stainless steel, polytetrafluoroethylene (PTFE) (Teflon®), polyether ether ketones (PEEK), polyurethanes, polyimides, polyamides (Nylon®), or combinations thereof. The flexible interlocked filaments may comprise a Young's Modulus for from 0.5 to 200 GPa (gigapascals). In certain embodiments, for example, the flexible interlocked filaments may comprise a Young's Modulus from at least any of the following: 0.5, 1, 10, 25, 50, and 75 GPa and/or at most about any of the following 200, 175, 150, 125, and 100 microns (e.g., 1-100 GPa, 25-175 GPa, etc.). Young's Modulus is a material property that can be interpreted as a measure of a material's stiffness in many circumstances. The plurality of slideably interlocked filaments may define a conduit comprising an interior interlocked filament section and an exterior interlocked filament section.

The compliant manipulators may also include at least one filament-actuating device (e.g., gimbal plate actuators, individual linear actuators, etc.) operatively connected to the respective proximate ends of the plurality of slideably interlocked filaments. The at least one filament-actuating device can be manipulated directly or remotely to push and/or pull the respective filaments to impart movement to the manipulator. In accordance with certain embodiments of the present invention, the filaments (e.g., push-pull filaments) may be anchored (e.g., fastened to each other) to each other at a discrete portion proximate to or at the tip of the manipulator (e.g., the distal end). Beneficially, however, the filaments are otherwise free to slide past one another. In accordance with certain embodiments of the present invention, the at least one filament-actuating device may comprise at least one gimbal plate or individual linear actuators. In this regard, the filaments can be actuated by using at least one gimbal plate and/or one or more individual linear actuators such as those used in a Bowden cable.

In accordance with certain embodiments of the present invention, each of the individual filaments of the plurality of slideably interlocked filaments include a longitudinal length extending from the proximate end to the distal end and a transverse length being shorter than the longitudinal length. In this regard, for example, the filaments may be provided in the structural form of a fine or thin fiber or wire in which the length is significantly greater than the cross section of the filament. Individual filaments of the plurality of slideably interlocked filaments, for example, may comprise a cross-sectional dimension (e.g., diameter) comprising from 0.1 mm to 10 mm. In accordance with certain embodiments, for example, individual filaments of the plurality of slideably interlocked filaments may comprise a cross-sectional dimension (e.g., diameter) comprising from at least any of the following: 0.1, 0.2, 0.3, 0.4, 0.5, 0.6, 0.7, 0.8, 0.9 and 1.0 mm and/or at most about any of the following 10, 8, 6, 4, 2, and 1 mm (e.g., 0.2-2 mm, 0.5-1.0 mm, etc.). Since the individual filaments of the plurality of slideably interlocked filaments may have a complex cross sectional shape (e.g., non-circular, etc.), "filament diameter" or "cross-sectional dimension" referenced above comprises the diameter of the minimum bounding circle that contains the cross sectional shape.

As noted above, manipulators according to certain embodiments of the present invention can comprise a plurality of individual slideably interlocked filaments. At least some, and in certain embodiments all of the individual filaments, may be slideably movable relative to adjacent filaments along the longitudinal length of the filaments. In this regard, the individual filaments may be interlocked to form a unitary structure while simultaneously providing relative movement between the individual filaments (or groups of filaments). In this regard, certain embodiments of the present invention provide better redundancy to filament failure as compared to traditional cable-driven devices.

For example, FIG. 1 illustrates a compliant manipulator according to certain embodiments of the present invention. As shown in FIG. 1, the manipulator 1 illustrated in FIG. 1 includes a plurality of slideably interconnected filaments comprising a first group of slideably interlocked filaments 10 and a second group of slideably interlocked filaments 20. In this particular embodiment, the individual filaments of the first group of slideably interlocked filaments are not interlocked with the individual filaments of the second group of slideably interlocked filaments. The individual filaments of the first group of slideably interlocked filaments 10 each include a distal end 12 and a proximate end 14. Similarly, the individual filaments of the second group of slideably interlocked filaments 20 each include a distal end 22 and a proximate end 24. As shown in FIG. 1, the proximate end of the individual filaments comprising the second group of slideably interlocked filaments 20 are operatively connected to a filament-actuating device (e.g, gimbal plate) 30 and the individual filaments comprising the first group of slideably interlocked filaments 10 are operatively connected to a different filament-actuating device (not shown). In this particular embodiment, the manipulator 1 includes both a flexible internal sheath 40 and a flexible external sheath 50, in which the plurality of slideably interlocked filaments 10, 20 are positioned between an annulus formed by the sheaths 40, 50. As shown in FIG. 1, the internal sheath 40 defines an internal lumen 44 throughout the length of the manipulator. In the embodiment shown in FIG. 1, the plurality of slideably interlocked filaments can be actuated relative to a mounting ring 60 by the filament-actuating device (e.g., gimbal plate) 30 at the base 70 of the manipulator.

As referenced above, the filaments may comprise structural configurations to enable interlocking of a plurality of the filaments to form a unitary group of slideably interlocked fibers in which individual filaments are allowed to slide in relation to one another along the axis of the manipulator (length of the filaments) while being interlocked to each other. Manipulators in accordance with certain embodiments of the present invention may comprise a plurality of slideably interlocked filaments, in which at least a portion (or all) of the individual filaments may comprise a male portion and a female portion. The female portion of the filaments may be configured for receiving the male portion of an adjacent filament to interlock the filaments. Similarly, the male portion of the filaments may be configured to be inserted and slideably interlocked within the female portion of an adjacent filament. In accordance with certain embodiments, the individual (e.g., some or all) filaments comprise a tongue-and-groove configuration. The tongue-and-groove structure of the filaments according to such embodiments form tongue-and-groove joints between adjacent filaments in which a plurality of filaments may be joined together to form a single structure (e.g., a cylindrical conduit). In such tongue-and-groove structural embodiments, the female portion of the filaments may comprise a groove cut or mold along one edge of the filament and the male portion of the filaments may comprise a ridge along an opposite edge of the filament. In this regard, the individual filaments may be interlocked to form a plurality of slideably interlocked filaments comprising a tongue-and-groove configuration. In accordance with certain embodiments, the filaments may comprise a male portion defining a generally T-shaped protrusion or ridge. In this regard, certain embodiments of the present invention may comprise at least one group of slideably interlocked filaments comprising a male portion defining a generally T-shaped protrusion and a female portion configured to receive such a T-shaped protrusion.

Figure 2:
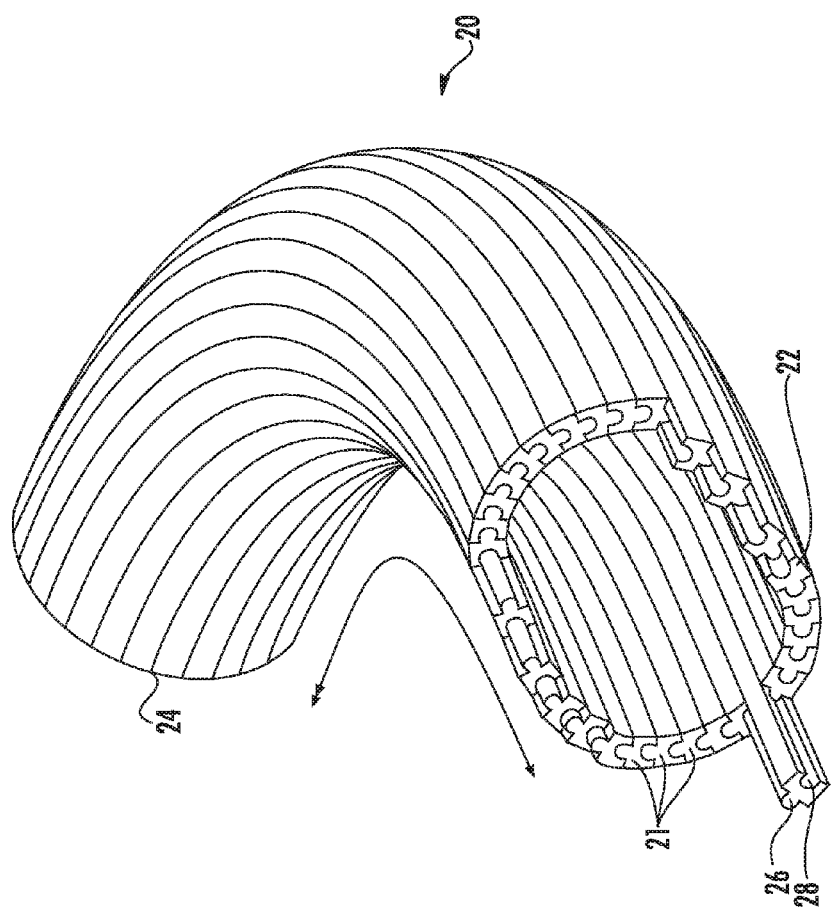
FIG. 2 illustrates a plurality of slideably interlocked filaments according to certain embodiments of the present invention.
Figure 3:
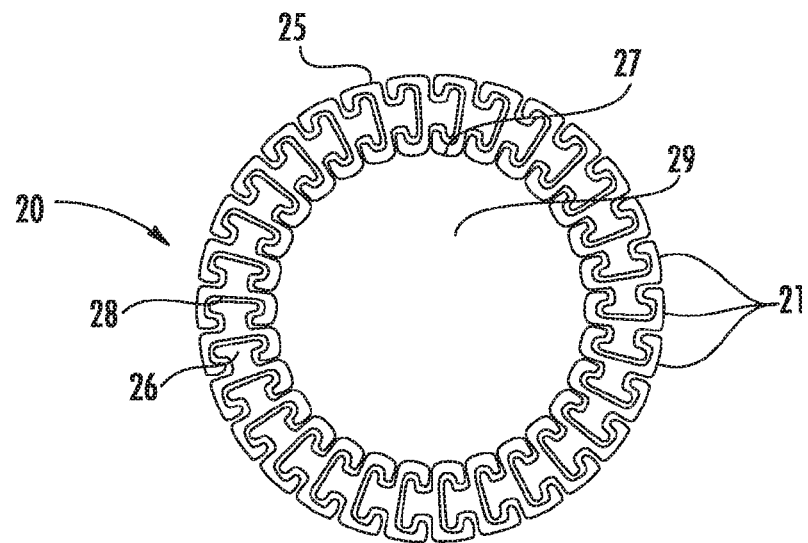
FIG. 3 illustrates a cross section of a plurality of slideably interlocked filaments according to certain embodiments of the present invention.

FIG. 2, for example, illustrates a plurality of slideably interlocked filaments according to certain embodiments of the present invention, in which the individual filaments comprise a tongue-and-groove structure. As shown in FIG. 2, a plurality of slideably interlocked filaments 20 includes a plurality of individual filaments 21 each having a distal end 22 and a proximate end 24. As shown in FIG. 2, each of the filaments 21 include a male portion 26 defining a tongue or ridge and a female portion 28 configured for slideably receiving the male portion of an adjacent filament. In this regard, the individual filaments 21 are interlocked to each other, while simultaneously being free to slideably move relative to each other along the longitudinal length of the filaments as illustrated by the double-headed arrow shown in FIG. 2. FIG. 3 illustrates a cross section of a plurality of slideably interlocked filaments according to certain embodiments of the present invention, in which the individual filaments 21 include a male portion 26 having a generally T-shaped protrusion. As best shown in FIG. 3, the plurality of slideably interlocked filaments 20 can define a conduit/lumen 28 comprising an interior interlocked filament section 27 and an exterior interlocked filament section 25.

In accordance with certain embodiments of the present invention, the manipulators may comprise a plurality of slideably interlocked filaments that may be anchored (directly or indirectly fastened) together at a single discrete section located proximate to or at the distal end or tip of the slideably interlocked filaments. In certain embodiments, the plurality of slideably interlocked filaments may be anchored (directly or indirectly fastened) together only at a single discrete section located proximate to or at the distal end or tip of the slideably interlocked filaments. In this regard, the individual slideably interlocked filaments are otherwise slideably movable relative to adjacent filaments along the longitudinal length of the filaments, with the exception of the section in which the filaments are anchored together. In this regard, an operator of manipulators according to certain embodiments of the present invention may initiate a sliding movement of one or more filaments to impart a desired movement or deformation of the distal end of the manipulator.

Figure 9:
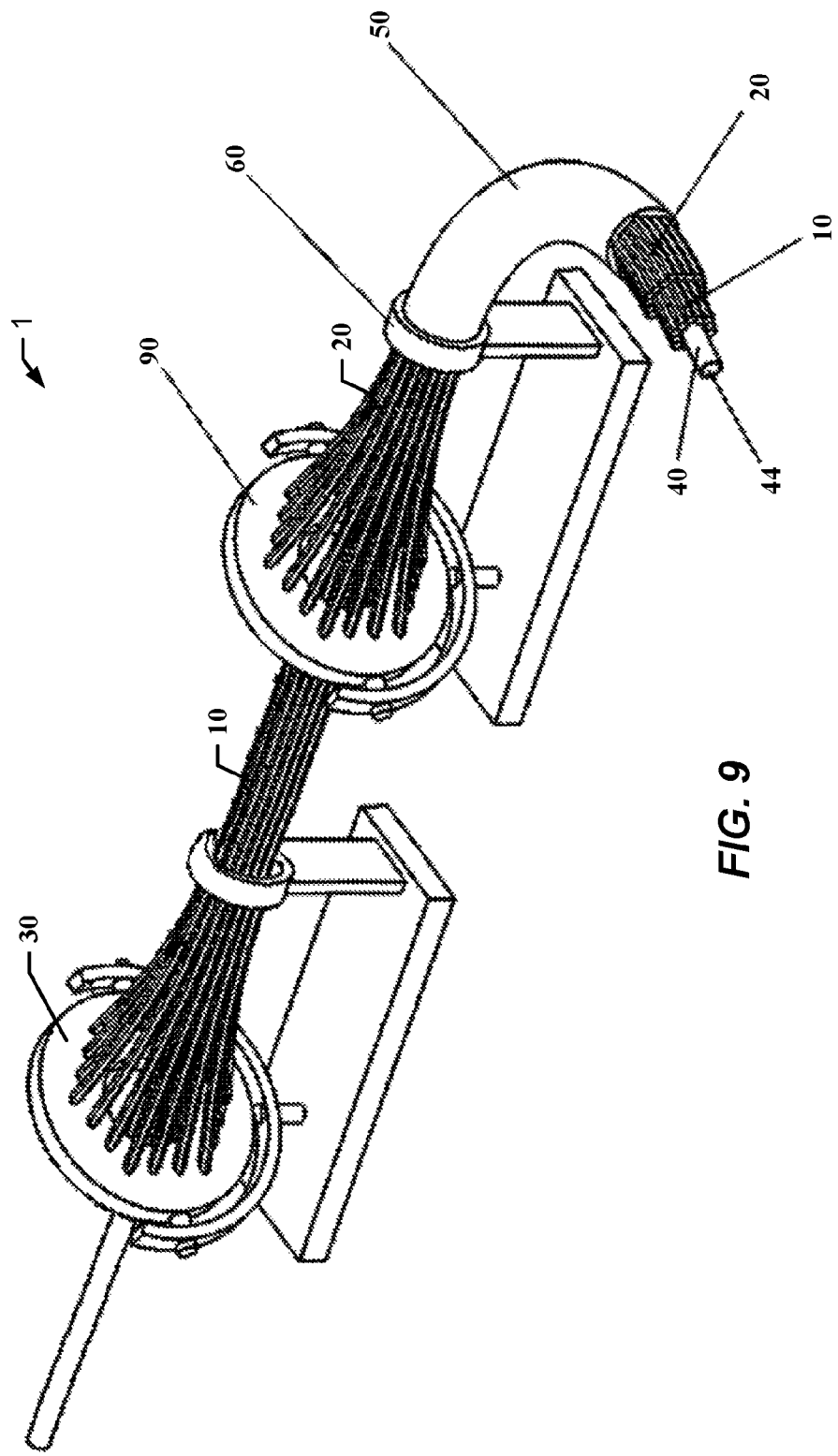
FIG. 9 illustrates a manipulator having first and second filament actuating devices.

In accordance with certain embodiments of the present invention, such as those illustrated by FIG. 9, the manipulators may comprise a plurality of slideably interlocked filaments including a first group of slideably interlocked filaments 10 operatively connected to a first filament-actuating device 30 and a second group of slideably interlocked filaments 20 operatively connected to a second filament-actuating device 90. In such embodiments, for example, separate bundles or groups of filaments can be routed to separate filament-actuating devices (e.g., gimbal plates). In accordance with certain embodiments, for instance, an outer bundle or group of filaments can be routed to a second gimbal plate actuator (e.g., second filament-actuating device 90) and an internal bundle or group of filaments can be routed to a first gimbal plate actuator (e.g., first filament-actuating device 30). In such embodiments, the plurality of slideably interlocked filaments can comprise a first plurality of slideably interlocked filaments and a second plurality of slideably interlocked filaments. In certain embodiments, for example, manipulators may comprise a second plurality of slideably interlocked filaments located inside and proximate to the interior interlocked filament section of a first plurality of slideably interlocked filaments. In accordance with certain embodiments, the manipulator may comprise a second plurality of slideably interlocked filaments located outside and proximate to the exterior interlocked filament section of a first plurality of slideably interlocked filaments.

As noted above and exemplified in FIG. 3, the plurality of slideably interlocked filaments may each have a proximate end and a distal end and define a conduit comprising an interior interlocked filament section and an exterior interlocked filament section. In accordance with certain embodiments of the present invention, the manipulator can also comprise a flexible internal sheath positioned proximate or adjacent to the interior interlocked filament section. The internal sheath may define a lumen along the length of the plurality of slideably interlocked filaments. The internal sheath may be formed from a flexible material, such as nitinol, TEFLON® or polytetrafluoroethylene (PTFE), or the like. In accordance with certain embodiments, the flexible internal sheath can comprise a variety of cross sections, including a circular cross section. The internal sheath, if present, can assist in confining the slideably interlocked filaments.

Figure 4:
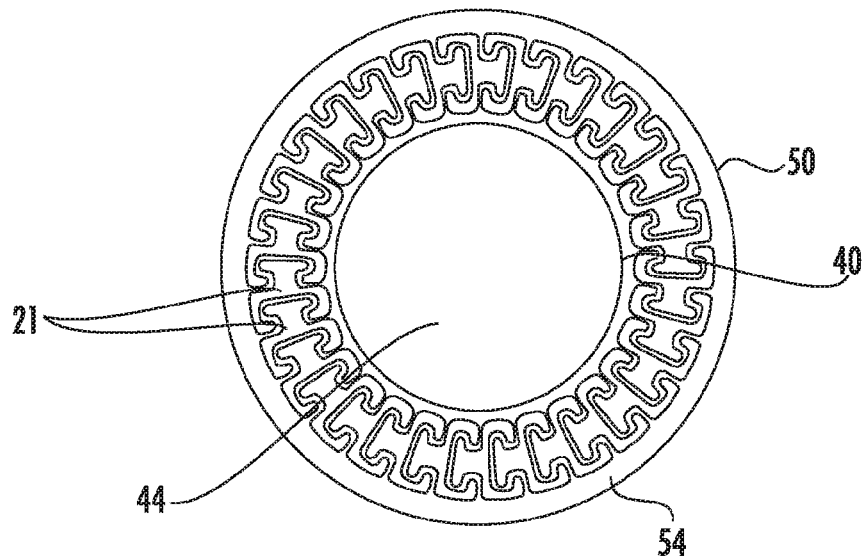
FIG. 4 illustrates a cross section of a plurality of slideably interlocked filaments positioned between an external flexible sheath and an internal flexible sheath.

In accordance with certain embodiments of the present invention the manipulators can comprise an external flexible sheath positioned proximate or adjacent to the exterior interlocked filament section. The external sheath may be formed from a flexible polymer, or super-elastic nitinol with appropriate notches. The flexible external sheath facilitates confining the filaments and preventing them from buckling under tension and/or compression. In accordance with certain embodiments, the manipulators can comprise both an internal flexible sheath and an external flexible sheath. FIG. 4, for example, illustrates a cross section of a plurality of slideably interlocked filaments positioned between an external flexible sheath 50 and an internal flexible sheath 40, in which the internal flexible sheath 40 defines a conduit/lumen 44 along the length of the plurality of slideably interlocked filaments. As discussed in more detail below, the external flexible sheath 50, the internal flexible sheath 40, and the plurality of slideably interlocked filaments 20 define a space 54 that may be filled with a viscosity controllable fluid if desired.

In accordance with certain embodiments of the present invention, the stiffness or flexibility of the manipulators may also be controlled/adjusted to provide varying degrees of stiffness during use. For instance, the stiffness or flexibility of the manipulators may be variably controlled by incorporating, for example, a magneto-rheological fluid, a phase transition material, or electro-rheological technology into the manipulators. In this regard, the stiffness of one or more discrete sections of the manipulator may be individually adjusted by utilizing one or more of the foregoing technologies by, for example, increasing or decreasing the inter-fiber friction between adjacent fibers to select a desired stiffness at one or more discrete sections of the manipulators.

In accordance with certain embodiments and as illustrated in FIG. 4, the manipulators may comprise a plurality of slideably interlocked filaments located between an external flexible sheath 50 and an internal flexible sheath 40. In such embodiments, the external flexible sheath 50, the internal flexible sheath 40, and the plurality of slideably interlocked filaments 20 define a space 54 that may be filled with a viscosity controllable fluid. In certain embodiments, the viscosity controllable fluid comprises a magneto-rheological fluid.

Figure 5:
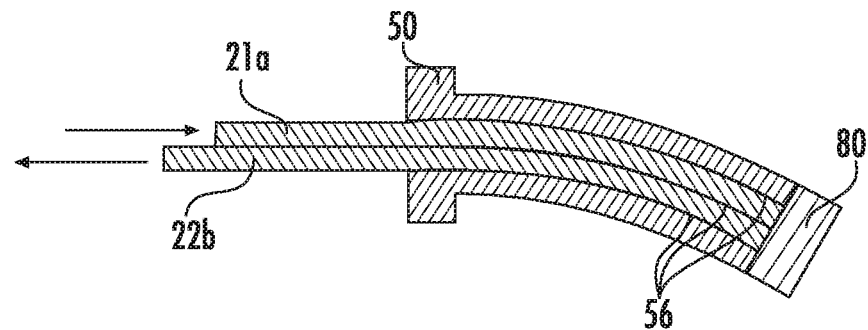
FIG. 5 illustrates a compliant manipulator according to certain embodiments of the present invention including a controllable viscosity fluid.

FIG. 5, for example, illustrates a schematic of a compliant manipulator according to certain embodiments of the present invention including a controllable viscosity fluid. In particular, FIG. 5 illustrates a compliant manipulator slideably interlocked filaments 21a, 21b enclosed or housed with in an external flexible sheath 50. The schematic of FIG. 5 shows filaments 21a, 21b anchored together 80 at the distal end of the manipulator. In the schematic of FIG. 5, the space 54 shown in FIG. 4 is filled with a viscosity controllable fluid 56.

A magneto-rheological fluid, as used herein, may comprise a liquid that hardens near a magnetic field, and becomes liquid again when the magnetic field is removed. The term magneto-rheological fluid (MRF) may refer, in accordance with certain embodiments of the present invention, to liquids that solidify in the presence of a magnetic field. Magneto-theological fluids comprise micrometer scale magnetic particles, and the magneto-rheological effect in fluids develops when the particle size is, for example, about 10 nanometers or larger. In accordance with certain embodiments, the particles can be iron, magnetite, cobalt, or other magnetic materials, and the surrounding liquid (e.g., carrier fluid in which the particles may be suspended) can comprise an oil, water, wax, or other solvent. Surfactants can be used to make the suspension more stable, for example, trapping particles in micelles to maintain separation. The magnetic field can be adjusted to manipulate the rigidity of the MRF to create different regions of rigidity through the length of the slideably interlocked filaments. For example, regions at the distal end of the slideably interlocked filaments could be in a flexible state, while regions at the proximal end (or an intermediate portion) of the slideably interlocked fibers remain rigid.

Figure 6:
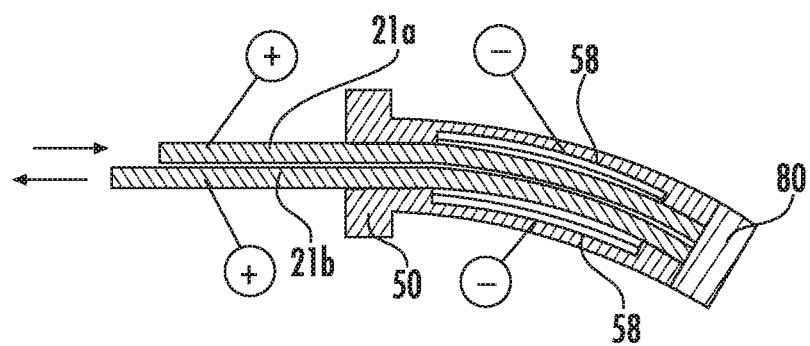
FIG. 6 illustrates a compliant manipulator according to certain embodiments of the present invention including magneto-rheological fluid and an electrical coil.

In such embodiments incorporating a magneto-rheological fluid, the manipulators may also comprise one or more coil portions, for example, encircling the space filled with the magneto-rheological fluid. In such embodiments, an electrical current can be increased and decreased as desired to induce a magnetic flux or field causing the viscosity of the magneto-rheological fluid to increase and decrease as desired. For example, the viscosity of along the entire length of the flexible structure or one or more discrete portions of the flexible structure can be adjusted by adjusting the current through a coil encircling a particular section of the flexible structure. In this regard, the stiffness of one or more small sections of the entire flexible structure of the manipulator can be adjusted prior to, during, or after numerous applications to provide one or more flexible portions and one or more stiff portions along the device. FIG. 6, for example, illustrates a schematic in which a manipulator includes a magneto-rheological fluid 56 and an electrical coil 59.

Figure 7:
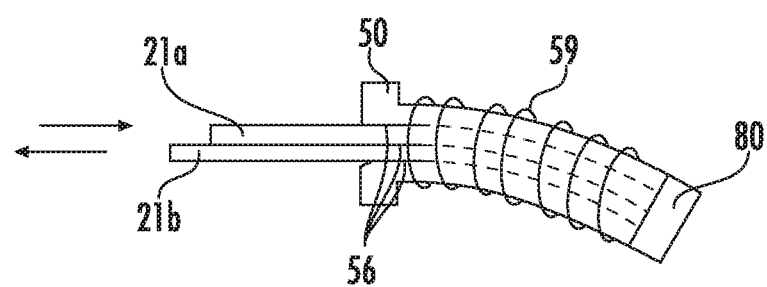
FIG. 7 illustrates a compliant manipulator according to certain embodiments of the present invention including electro-rheological technology.

In certain embodiments, as illustrated by the schematic of FIG. 7, the viscosity controllable fluid comprises an electro-rheological fluid. The manipulator may further comprise at least one electrode 58 positioned between the external flexible sheath 50 and the exterior interlocked filament section, in which the exterior interlocked filament section functions as a counter electrode. The electro-rheological fluid may provide the manipulators the feature of having an adaptable stiffness along the entire length of the slideably interlocked filaments or along one or more discreet sections of the filaments. By application of an electric field, the electro-rheological fluid is capable of reversibly transitioning between a liquid-like state and a gel-like or solid-like state, thereby changing its stiffness and the stiffness of the manipulator in which the electro-rheological fluid is used. At a proximal portion, for example, the electro-rheological fluid can enhance the stiffness or pushability of the medical device, and at a distal portion, the electro-rheological fluid can enhance the flexibility and trackability of the manipulator. The stiffness of the electro-rheological fluid can be controlled by adjusting the application of the electric field.

An electro-rheological fluid, as used herein, may comprise a material whose rheological properties can be selectively varied, such as through application of an external electric field by conductive members. For example, under the application of an external field, the electro-rheological fluid is capable of increasing its viscosity by transforming from a liquid-like material to a gel-like or solid-like material capable of exhibiting solid-like behavior, such as the ability to transmit shear stress. When the applied external field is removed, the electro-rheological fluid is capable of quickly (e.g., less than 10 msec) and reversibly transforming from the gel-like or solid-like material to the liquid-like material. Thus, by integrating the electro-rheological fluid within the manipulator and controlling the electric field that is applied, the stiffness of the manipulator (in entirety or at discreet local sections) can be controlled. When an electric field is applied, the electro-rheological fluid transforms to the gel-like or solid-like material and increases the stiffness of the manipulator. When the electric field is removed, the electro-rheological fluid transforms to the liquid-like material and decreases the stiffness of the manipulator, thereby increasing the flexibility of the manipulator.

In accordance with certain embodiments, the electro-rheological fluid may include a mixture, such as a colloidal suspension, of particles and a liquid that can exhibit high yield strength. On application of an electric field, induced polarization causes the particles to form elongated chains, columns, or fibrous structures aligned parallel to the electric field. An example of a particle is a composite particle having a barium titanyl oxalate core coated with a promoter such as urea, butyramide, acetamide, or acrylamide. The particles can have an average size, for example, of about 50-70 nm, and each particle can have a surface coating, for example, of about 3-10 nm. The particles can be present in a volume concentration comprising from about 5% to about 50%. The liquid in the electro-rheological fluid can be an electrically insulating, hydrophobic liquid, such as an oil, for example, silicone oils, mineral oils, engine oils, and hydrocarbon oils.

Manipulators according to certain embodiments of the present invention may comprise a plurality of slideably interlocked filaments located between an external flexible sheath and an internal flexible sheath. In such embodiments, the external flexible sheath, the internal flexible sheath, and the plurality of slideably interlocked filaments define a space that may be filled with a phase transition composition, such as a liquid-solid phase transition material.

In another aspect, the present invention provides methods of using compliant manipulators according to certain embodiments of the present invention. For example, manipulators according to certain embodiments of the present invention can include various engineering, medical, and cleaning applications as the manipulator can reach into spaces difficult to inspect and clean (e.g., inside internal combustion engines, etc.). The high strength and stiffness realized by certain embodiments of the present invention make the manipulator robust and suitable for demanding tasks such as cleaning, abrasion, construction, drilling, etc.

Additional methods of use include a variety of law enforcement applications, in which the manipulator can be moved directly, remotely, or both to inspect and/or view difficult-to-reach areas, such as rooms in buildings. Moreover, the lumen defined by manipulators according to certain embodiments of the present invention allows the use of different tools to be used, such as drilling tools for drilling holes in walls, etc. For instance, a drilling implement can be mounted to the distal end of the manipulator or fed through the lumen of the manipulator to a point of interest. The improved stiffness afforded by certain embodiments of the present invention facilitates drilling (or similar) operations.

Certain embodiments of the present invention may also be utilized in methods of performing various surgical procedures (e g, minimally invasive procedures), including robotic surgery (e.g., remotely operated) or directly operated (e.g., locally operated) by a surgeon. The deformable shape of manipulators according to certain embodiments of the present invention allows it to enter a confined space (e.g., a body cavity) through a small hole (e.g., incision) and reach many points within such a space. By way of example only, treatment of osteolytic bone in hip revision surgeries can be carried-out using manipulators according to certain embodiments of the present invention.

Example

The present disclosure is further illustrated by the following example, which in no way should be construed as being limiting. That is, the specific features described in the following examples are merely illustrative, and not limiting.

Figure 8A:
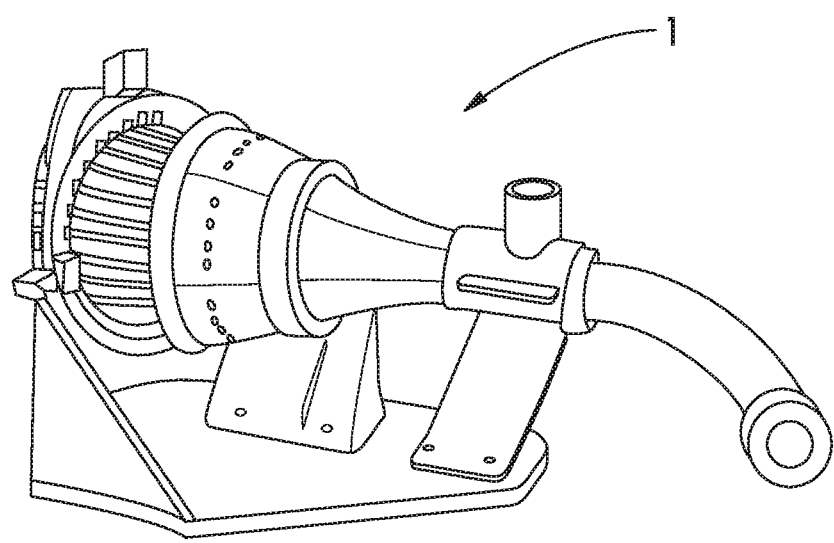
FIG. 8A shows a manipulator including thirty (30) interlocked filaments.
Figure 8B:
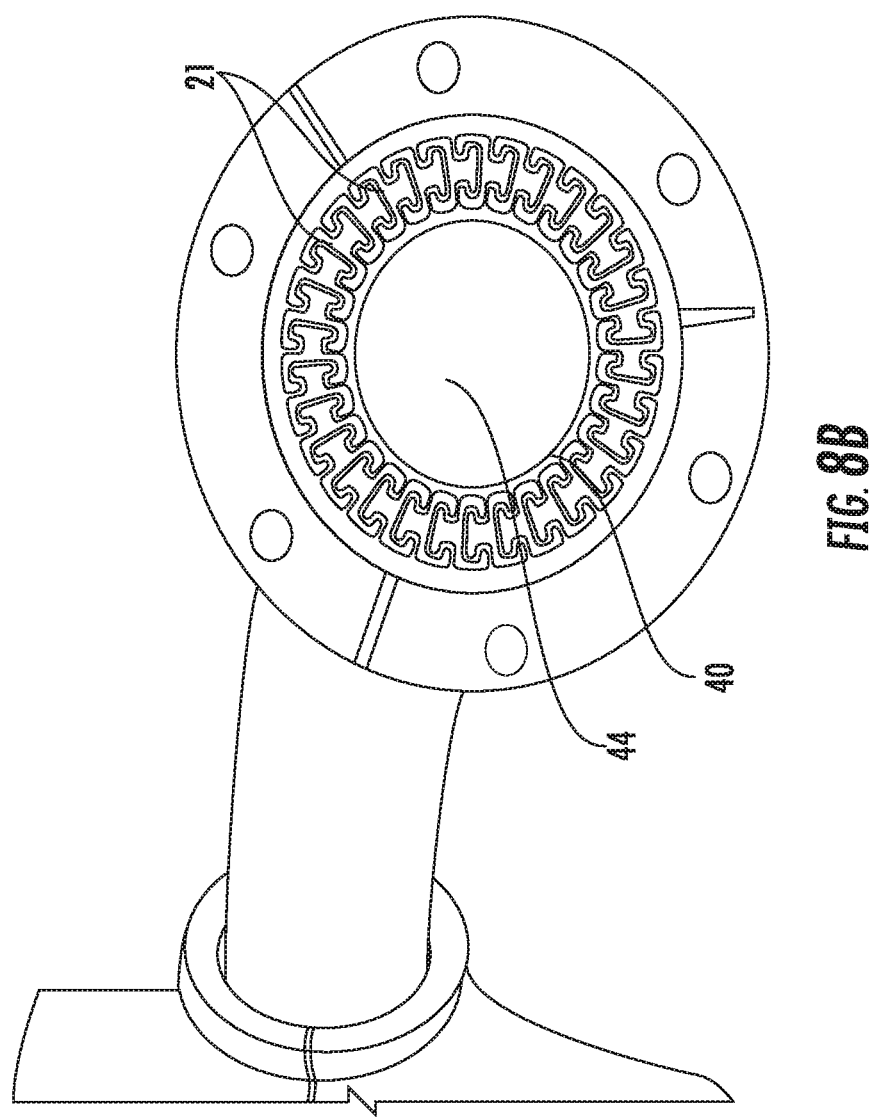
FIG. 8B shows an end-view of a distal end of the manipulator shown in FIG. 8A.

A compliant manipulator was constructed using an arrangement of thirty (30) interlocking filaments as shown in FIGS. 8A and 8B. The manipulator shown in FIGS. 8A and 8B is illustrative of a single embodiment, and manipulators according to certain embodiments of the present invention may comprise many different configurations. The filaments of the manipulator were driven by a gimbaled plate. This construction allowed the manipulator to bend in a single mode in two axes, while preserving a large open lumen through the entirety of the flexible structure. Dual mode and higher bends can be achieved by nesting multiple manipulators or by interleaving independently driven sets of fibers within the same bundle. FIG. 8B shows an end-view of a distal end of the manipulator, in which the cross-section of the slideably interlocked filaments can be viewed. The individual flexible filaments were made of cast polyurethane and had a diameter of 8 mm and a length of 25 cm.

These and other modifications and variations to the present invention may be practiced by those of ordinary skill in the art without departing from the spirit and scope of the present invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. A compliant manipulator, comprising:
   a flexible internal sheath;
   a flexible external sheath;
   a plurality of slideably interlocked filaments disposed between the flexible internal sheath and the flexible external sheath and defining a conduit, wherein each of the plurality of slideably interlocked filaments have a proximate end and a distal end and comprise a flexible material; and
   at least one filament-actuating device operatively connected to the respective proximate ends of the plurality of slideably interlocked filaments to apply push and pull forces to selected ones of the plurality of slideably interlocked filaments to cause individual slideably interlocked filaments to slideably move relative to adjacent filaments along a longitudinal length of the plurality of slideably interlocked filaments;

wherein the plurality of slideably interlocked filaments comprise a male portion defining a generally T-shaped protrusion and a female portion, said female portion being configured for receiving the male portion of an adjacent filament; and wherein a second surface of the flexible internal sheath defines a lumen along the length of the plurality of slideably interlocked filaments, the second surface of the flexible internal surface being opposite to the first surface of the flexible internal sheath;

wherein the plurality of slideably interlocked filaments include a first group of slideably interlocked filaments disposed adjacent a first surface of the flexible internal sheath and operatively connected to a first filament-actuating device of the at least one filament-actuating device, and the plurality of slideably interlocked filaments further including a second group of slideably interlocked filaments disposed adjacent a first surface of the flexible external sheath and operatively connected to a second filament-actuating device of the at least one filament-actuating device;

wherein the second group of slideably interlocked filaments are located proximate an internal surface of the first group of slideably interlocked filaments, wherein the first filament-actuating device is a first gimbal plate actuator, and wherein the second group of slideably interlocked filaments pass through an opening in the first gimbal plate actuator to operatively connect to the second filament-actuating device.

2. The manipulator of claim 1, wherein the longitudinal length of each of the plurality of slideably interlocked filaments extends from the proximate end to the distal end and a transverse length being shorter than the longitudinal length.

3. The manipulator of claim 2, wherein the plurality of slideably interlocked filaments are only anchored together at a single discrete section being located proximate to or at the distal end of the slideably interlocked filaments.

4. The manipulator of claim 1, wherein a space defined by the external flexible sheath, the internal flexible sheath, and the plurality of slideably interlocked filaments is filled with a viscosity controllable fluid.

5. The manipulator of claim 4, wherein the viscosity controllable fluid comprises a magneto-rheological fluid.

6. The manipulator of claim 5, further comprising at one or more coil portions encircling the space filled with the magneto-rheological fluid.

7. The manipulator of claim 4, wherein the viscosity controllable fluid comprises an actuatable polymer; and wherein the manipulator further comprises at least one electrode.

8. The manipulator of claim 1, wherein a space defined by the external flexible sheath, the internal flexible sheath, and the plurality of slideably interlocked filaments is filled with a phase transition composition.

9. The manipulator of claim 1, wherein the plurality of slideably interlocked filaments are directly interlocked with each other.

10. The manipulator of claim 1, wherein the plurality of slideably interlocked filaments are located between an external flexible sheath and an internal flexible sheath; and wherein a space is defined by the external flexible sheath, the internal flexible sheath, and the plurality of slideably interlocked filaments.

11. The manipulator of claim 1, wherein the second filament-actuating device is a second gimbal plate actuator.

12. The manipulator of claim 1, wherein the flexible internal sheath is configured to confine the plurality of slideably interlocked filaments.

13. The manipulator of claim 1, wherein the flexible internal sheath is formed of nitinol or polytetrafluoroethylene.

14. The manipulator of claim 1, wherein the flexible external sheath is formed of a polymer or nitinol.

* * * * *